US010800908B2

(12) United States Patent
Den Doelder et al.

(10) Patent No.: US 10,800,908 B2
(45) Date of Patent: Oct. 13, 2020

(54) POLYETHYLENE COMPOSITION, METHOD OF MAKING THE SAME, AND FILMS MADE THEREFROM

(71) Applicant: Dow Global Technologies LLC, Midland, MI (US)

(72) Inventors: Cornelis F. J. Den Doelder, Terneuzen (NL); Jesus Nieto, Tarragona (ES); Frederik Gemoets, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 128 days.

(21) Appl. No.: 16/081,286

(22) PCT Filed: Mar. 3, 2017

(86) PCT No.: PCT/US2017/020704
§ 371 (c)(1),
(2) Date: Aug. 30, 2018

(87) PCT Pub. No.: WO2017/152078
PCT Pub. Date: Sep. 8, 2017

(65) Prior Publication Data
US 2019/0062540 A1    Feb. 28, 2019

(30) Foreign Application Priority Data

Mar. 3, 2016 (EP) .................................. 16382095

(51) Int. Cl.
| | | |
|---|---|---|
| *C08J 5/22* | (2006.01) | |
| *C08L 23/08* | (2006.01) | |
| *C08J 5/18* | (2006.01) | |
| *B32B 27/20* | (2006.01) | |
| *B32B 7/12* | (2006.01) | |
| *B32B 27/06* | (2006.01) | |
| *B32B 7/04* | (2019.01) | |
| *B32B 27/18* | (2006.01) | |
| *B32B 27/32* | (2006.01) | |
| *B32B 27/08* | (2006.01) | |
| *C08F 4/659* | (2006.01) | |

(52) U.S. Cl.
CPC .......... *C08L 23/0815* (2013.01); *B32B 7/04* (2013.01); *B32B 7/12* (2013.01); *B32B 27/06* (2013.01); *B32B 27/08* (2013.01); *B32B 27/18* (2013.01); *B32B 27/20* (2013.01); *B32B 27/32* (2013.01); *C08J 5/18* (2013.01); *B32B 2307/72* (2013.01); *B32B 2307/732* (2013.01); *B32B 2439/70* (2013.01); *B32B 2553/00* (2013.01); *C08F 4/65908* (2013.01); *C08J 2323/08* (2013.01); *C08J 2423/06* (2013.01); *C08L 2203/16* (2013.01); *C08L 2205/02* (2013.01); *C08L 2207/066* (2013.01); *C08L 2314/06* (2013.01)

(58) Field of Classification Search
CPC ................ C08F 210/16; C08F 2500/12; C08F 2500/26; C08J 5/22; C08J 5/2218
See application file for complete search history.

(56) References Cited

U.S. PATENT DOCUMENTS

| | | |
|---|---|---|
| 5,064,802 A | 11/1991 | Stevens et al. |
| 5,153,157 A | 10/1992 | Hlatky et al. |
| 5,296,433 A | 3/1994 | Siedle et al. |
| 5,321,106 A | 6/1994 | Lapointe |
| 5,350,723 A | 9/1994 | Neithamer et al. |
| 5,425,872 A | 6/1995 | Devore et al. |
| 5,625,087 A | 4/1997 | Neithamer et al. |
| 5,721,185 A | 2/1998 | Lapointe et al. |
| 5,783,512 A | 7/1998 | Jacobsen et al. |
| 5,883,204 A | 3/1999 | Spencer et al. |
| 5,919,983 A | 7/1999 | Rosen et al. |
| 5,977,251 A | 11/1999 | Kao et al. |
| 6,103,657 A | 8/2000 | Murray |
| 6,448,341 B1* | 9/2002 | Kolthammer ......... C08F 210/16 264/310 |
| 6,515,155 B1 | 2/2003 | Klosin et al. |
| 6,696,379 B1 | 2/2004 | Carnahan et al. |
| 7,163,907 B1 | 1/2007 | Canich et al. |
| 8,372,931 B2 † | 2/2013 | Hermel-Davidock |
| 8,450,438 B2 † | 5/2013 | Aboelella |
| 8,709,611 B2 † | 4/2014 | Haley |
| 8,816,006 B2* | 8/2014 | Fuchs ................. C08L 23/0815 525/88 |

(Continued)

FOREIGN PATENT DOCUMENTS

WO    2011002868 A2    1/2011

OTHER PUBLICATIONS

Williams et al., "The Construction of a Polyethylene Calibration Curve for Gel Permeation Chromatography Using Polystrene Fractions", Polymer Letters, 1968, 6, 621-624.
Monrabal et al., "Crystallization Elution Fractionation. A New Separation Process for Polyolefin Resins", Macromol. Symp. 2007, 257, 71-19.
Karjala et al., "Detection of Low Levels of Long-Chain Branching in Polyolefins", ANTEC 2008, 887-891.
Busico et al., "1H NMR Analysis of Chain Unsaturations in Ethene/1-Octene Copolymers Prepared with Metallocene Catalysts at High Temperature", Macromolecules, 2005, 38, 6988-6996.

(Continued)

*Primary Examiner* — Rip A Lee
(74) *Attorney, Agent, or Firm* — Dinsmore & Shohl LLP

(57) ABSTRACT

The present disclosure provides linear low density polyethylene compositions, films and method of making the same. The linear low density polyethylene compositions, according to the present disclosure, exhibit each of the following properties: (1) a CEF fraction from 70 to 90 C of equal to or greater than 80% of the total CEF fractions; (2) a melt index, I2, measured according to ASTM D 1238 (2.16 kg @190 C), in the range of from 0.8 to 1.2 g/10 minutes; and (3) a melt flow ratio, I10/I2, in the range of from 7.0 to 8.0.

9 Claims, 3 Drawing Sheets

(56) References Cited

U.S. PATENT DOCUMENTS

| | | | |
|---|---|---|---|
| 8,957,158 B2 | 2/2015 | Fantinel et al. | |
| 8,993,693 B2 | 3/2015 | Lu et al. | |
| 9,029,478 B2 | 5/2015 | Mavridis | |
| 9,115,275 B2 * | 8/2015 | Kupar | C07F 7/1804 |
| 10,239,974 B2 * | 3/2019 | Kapur | C08F 210/16 |
| 10,357,948 B2 * | 7/2019 | Pan | B32B 27/08 |
| 10,363,700 B2 * | 7/2019 | Yun | B32B 27/36 |

OTHER PUBLICATIONS

International Search Report and Written Opinion pertaining to PCT/US2017/020704 dated Apr. 12, 2017.

\* cited by examiner
† cited by third party

```
;cdprf2_zz
prosol relations=<lcnmr>
#include <Avance.incl>

"d12=20u"
"d11=tu"

1 ze
d12 pl21:f1
2 30m
d13
d12 pl9:f1
d1 cw:f1 ph29 cw:f2 ph29
d11 do:f1 do:f2
d12 pl11:f1
p1 ph1
go=2 ph31
30m mc #0 to 2 F0(zd)
exit ph 1=0 2 2 0 1 3 3 1
ph 29=0
ph 31=0 2 2 0 1 3 3 1
```

FIG. 3

POLYETHYLENE COMPOSITION, METHOD OF MAKING THE SAME, AND FILMS MADE THEREFROM

FIELD OF INVENTION

The instant invention relates to a linear low density polyethylene composition, a method of making the composition, and films made therefrom.

BACKGROUND OF THE INVENTION

The use of polyethylene compositions, such as linear low density polyethylenes (LLDPE), in fabrication of films is generally known. Any conventional method, such as gas phase process, slurry process, or solution process, may be employed to produce such polyethylene compositions. In addition, any conventional film process such as blown film extrusion process may be employed to produce such films.

Various polymerization techniques using different catalyst systems have been employed to produce such polyethylene compositions suitable for film production applications. Currently available polyethylene compositions fail to meet all the desired film properties while providing additional cost benefits.

Despite the research efforts in developing polyethylene compositions suitable for film production applications, there is still a need for a lower cost linear low density polyethylene composition having improved properties.

SUMMARY OF THE INVENTION

The present disclosure provides a linear low density polyethylene composition, a method of making the composition, films made therefrom, and methods of making the films. In one embodiment, the present disclosure provides linear low density polyethylene compositions which exhibit each of the following properties: (1) a CEF fraction from 70 to 90° C. of equal to or greater than 80% of the total CEF fractions; (2) a melt index, $I_2$, measured according to ASTM D 1238 (2.16 kg @190° C.), in the range of from 0.8 to 1.5 g/10 minutes; and (3) a melt flow ratio, $I_{10}/I_2$, in the range of from 7.0 to 8.0.

In an alternative embodiment, the present disclosure further provides film layer comprising a linear low density polyethylene composition which exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), in the range of from 0.8 to 1.5 g/10 minutes; and (3) a melt flow ratio, $I_{10}/I_2$, in the range of from 7.0 to 8.0.

In an alternative embodiment, the present disclosure further provides a method for producing a film comprising: (a) blow extruding a linear low density polyethylene composition which exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), in the range of from 0.8 to 1.5 g/10 minutes; and (3) a melt flow ratio, $I_{10}/I_2$, in the range of from 7.0 to 8.0.

In an alternative embodiment, the present disclosure further provides linear low density polyethylene compositions, films and method of making the same in accordance with any of the preceding embodiments, except that the linear low density polyethylene resin further exhibits a density (measured according to ASTM D792) from 0.914 to 0.920 g/cm².

In an alternative embodiment, the present disclosure further provides linear low density polyethylene compositions, films and method of making the same in accordance with any of the preceding embodiments, except that the linear low density polyethylene comprises units derived from ethylene and units derived from one or more alpha-olefin comonomers.

In an alternative embodiment, the present disclosure further provides linear low density polyethylene compositions, films and method of making the same in accordance with any of the preceding embodiments, except that the comonomer is 1-hexene.

In an alternative embodiment, the present disclosure further provides linear low density polyethylene compositions, films and method of making the same in accordance with any of the preceding embodiments, except that the comonomer is 1-octene.

In an alternative embodiment, the present disclosure further provides linear low density polyethylene compositions, films and method of making the same in accordance with any of the preceding embodiments, except that the comonomer is 1-butene.

In an alternative embodiment, the present disclosure further provides linear low density polyethylene compositions, films and method of making the same in accordance with any of the preceding embodiments, except that the linear low density polyethylene composition is produced by a solution phase process utilizing one reactors.

In an alternative embodiment, the present disclosure further provides linear low density polyethylene compositions, films and method of making the same in accordance with any of the preceding embodiments, except that the linear low density polyethylene composition is produced in a single loop solution polymerization reactor in the presence of hexene.

In an alternative embodiment, the present disclosure further provides linear low density polyethylene compositions, films and method of making the same in accordance with any of the preceding embodiments, except that the film layer comprises the linear low density polyethylene composition and a low density polyethylene.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIG. 3 is modified pulse sequences for unsaturation with Bruker AVANCE 400 MHz spectrometer.

DETAILED DESCRIPTION OF THE INVENTION

Figure 1:
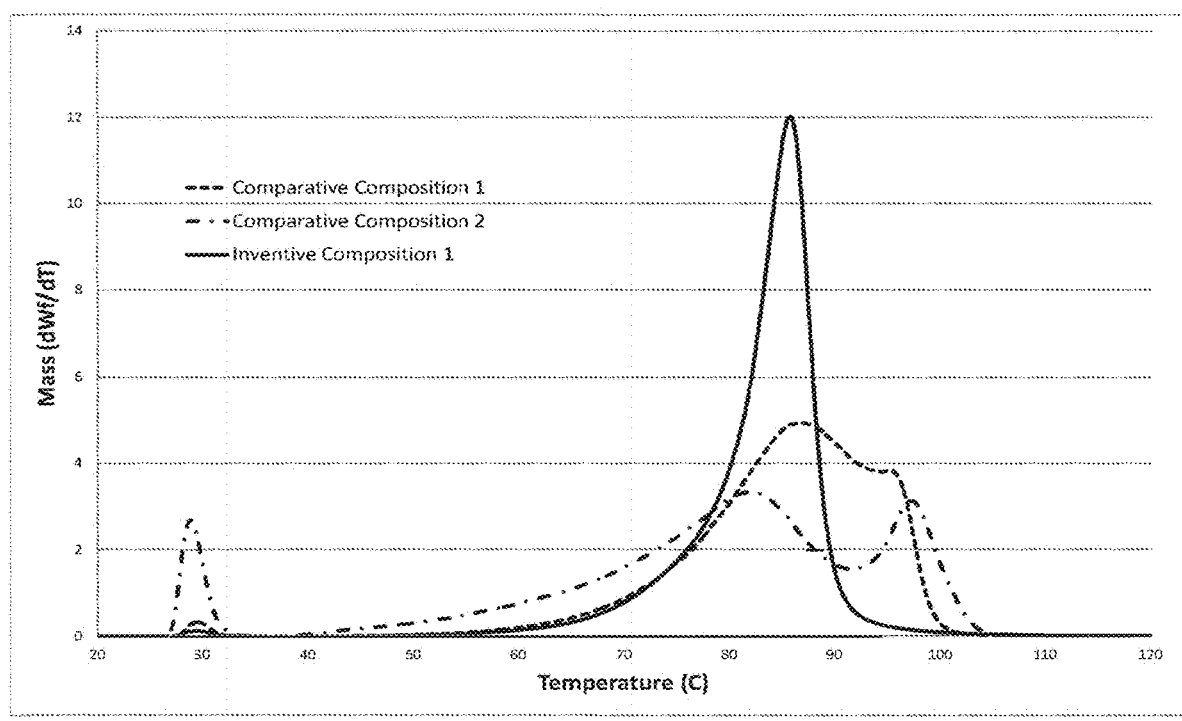
FIG. 1 is a graph illustrating the CFF results (Eluted Mass ($dW_T/dT$ versus Temperature) for each of Comparative Examples 1 and 2 and Inventive Example 1.

The present disclosure provides linear low density polyethylene compositions, films and method of making the same. The linear low density polyethylene compositions, according to the present disclosure, exhibit each of the following properties: (1) a CEF fraction from 70 to 90° C. of equal to or greater than 80% of the total CEF fractions; (2) a melt index, $I_2$, measured according to ASTM D 1238

(2.16 kg @190° C.), in the range of from 0.8 to 1.5 g/10 minutes; and (3) a melt flow ratio, $I_{10}/I_2$, in the range of from 7.0 to 8.0.

The film layers, according to the present disclosure, comprise a linear low density polyethylene composition which exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), in the range of from 0.8 to 1.5 g/10 minutes; and (3) a melt flow ratio, $I_{10}/I_2$, in the range of from 7.0 to 8.0.

The film layers, according to the present disclosure, can comprise the linear low density polyethylene composition and a low density polyethylene. The film layers can comprise from less than 50 percent by weight of a low density polyethylene, for example from 5 to 45 weight percent, or from 5 to 35 weight percent, or from 15 to 35 weight percent.

Linear Low Density Polyethylene

The linear low density polyethylene composition which exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), in the range of from 0.8 to 1.5 g/10 minutes; and (3) a melt flow ratio, $I_{10}/I_2$, in the range of from 7.0 to 8.0.

The linear low density polyethylene (LLDPE) comprises an ethylene/α-olefin copolymer comprising (a) less than or equal to 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers. The term "ethylene/α-olefin copolymer" refers to a polymer that contains more than 50 mole percent polymerized ethylene monomer (based on the total amount of polymerizable monomers) and at least one other comonomer.

The α-olefin comonomers typically have no more than 20 carbon atoms. For example, the α-olefin comonomers may preferably have 3 to 8 carbon atoms, and more preferably 3 to 6 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene,1-hexene, or in the alternative, from the group consisting of 1-butene and 1-hexene. In one embodiment, the linear low density polyethylene resin comprises no units derived from 1-octene.

The LLDPE has a CEF fraction from 70 to 90° C. of equal to or greater than 80% of the total CEF fractions, for example, LLDPE has a CEF fraction from 70 to 90° C. of equal to or greater than 85% of the total CEF fractions, or in the alternative, LLDPE has a CEF fraction from 70 to 90° C. of equal to or greater than 90% of the total CEF fractions.

The LLDPE has a melt index, $I_2$, measured according to ASTM D 1238 (2.16 kg @190° C.), in the range of from 0.8 to 1.5 g/10 min. All individual values and subranges from 0.8 to 1.5 g/10 min are included and disclosed herein; for example, the $I_2$ may range from a lower limit of 0.8, 1.0, 1.2 or 1.4 g/10 min to an upper limit of 0.9, 1.1, 1.3 or 1.5 g/10 min. For example, the $I_2$ may be from 0.8 to 1.5 g/10 min, or in the alternative, from 0.9 to 1.2 g/10 min, or in the alternative, from 1.0 to 1.5 g/10 min.

The LLDPE is characterized by having a zero shear viscosity ratio (ZSVR) in the range of from 1.2 to 5. All individual values and subranges are disclosed and included herein; for example, the ZSVR can range from a lower limit of 1.2, 2.2, 3.2 or 4.2 to an upper limit of 1.5, 2.6, 3.5, 4.4 or 5. For example, the ZSVR can range from 1.2 to 5, or in the alternative, from 1.5 to 4, or in the alternative, from 1.2 to 3.1, or in the alternative, from 3 to 5, or in the alternative, from 2 to 4.

The LLDPE has a density in the range of 0.914 to 0.920 g/cm$^3$. All individual values and subranges from 0.914 to 0.920 g/cm$^3$ are included and disclosed herein. For example, the density can be from a lower limit of 0.914, 0.916, 0.918 g/cm$^3$ to an upper limit of 0.920, 0.917, or 0.915 g/cm$^3$. For example, the density can range from 0.914 to 0.920 g/cm$^3$, or in the alternative, from 0.914 to 0.918 g/cm$^3$, or in the alternative, from 0.913 to 0.919 g/cm$^3$, or in the alternative, from 0.918 to 0.920 g/cm$^3$, or in the alternative, from 0.915 to 0.919 g/cm$^3$.

The LLDPE has a molecular weight distribution ($M_w/M_n$) in the range of from 2.0 to 3.5. All individual values and subranges from 2.0 to 3.5 are included and disclosed herein; for example, the molecular weight distribution ($M_w/M_n$) can range from a lower limit of 2, 2.1, 2.2, 2.4, 2.5, or 2.6 to an upper limit of 2.2, 2.3, 2.4, 2.5, 2.7, 2.9, 3.2, or 3.5. For example, the molecular weight distribution ($M_w/M_n$) can be from 2.0 to 3.5, or in the alternative, from 2.0 to 2.4, or in the alternative, from 2.0 to 2.8, or in the alternative, from 2.8 to 3.5.

The LLDPE has a molecular weight distribution ($M_z/M_n$) in the range of from 3.5 to 6. All individual values and subranges from 3.5 to 6 are included and disclosed herein; for example, the molecular weight distribution ($M_z/M_n$) can be from a lower limit of 3.5, 3.7, 3.9, 4.5 or 5 to an upper limit of 3.5, 4.0, 4.2, 4.4, 4.7, 5.0, 5.5 or 6.0. For example, the molecular weight distribution ($M_z/M_n$) can range from 3.5 to 6, or in the alternative, from 3.5 to 4.8, or in the alternative, from 4.8 to 6, or in the alternative, from 4 to 5, or in the alternative, from 3.5 to 4.5.

The LLDPE has a molecular weight distribution asymmetry $[(M_w/M_n)/(M_z/M_w)]$ i.e. $M_w^2/(M_n*M_z)$ in the range of from 1.00 to 1.40. For example, the molecular weight distribution asymmetry $M_w^2/(M_n*M_z)$ can be from a lower limit of 1.0, 1.05, 1.10, 1.15 or 1.20 to an upper limit of 1.25, 1.30, 1.35, or 1.40. For example, the molecular weight distribution asymmetry $M_w^2/(M_n*M_z)$ can range from 1.00 to 1.40, or in the alternative, from 1.00 to 1.20, or in the alternative, from 1.20 to 1.40, or in the alternative, from 1.10 to 1.30.

The LLDPE has a vinyl unsaturation of less than 0.15 vinyls per one thousand carbon atoms present in the backbone of the LLDPE. All individual values from less than 0.15 vinyls per one thousand carbon atoms are included and disclosed here. For example, the LLDPE may have a vinyl unsaturation of less than 0.15 vinyls per one thousand carbon atoms, or in the alternative, less than 0.12 vinyls per one thousand carbon atoms, or in the alternative, less than 0.09 vinyls per one thousand carbon atoms, or in the alternative, less than 0.06 vinyls per one thousand carbon atoms.

In one embodiment, the LLDPE comprises less than or equal to 100 parts, for example, less than 10 parts, less than 8 parts, less than 5 parts, less than 4 parts, less than 1 parts, less than 0.5 parts, or less than 0.1 parts, by weight of metal complex residues remaining from a catalyst system comprising a metal complex of a polyvalent aryloxyether per one million parts of the LLDPE. The metal complex residues remaining from the catalyst system comprising a metal complex of a polyvalent aryloxyether in the LLDPE may be measured by x-ray fluorescence (XRF), which is calibrated to reference standards. The polymer resin granules can be compression molded at elevated temperature into plaques having a thickness of about ⅜ of an inch for the x-ray measurement in a preferred method. At very low concentrations of metal complex, such as below 0.1 ppm, ICP-AES would be a suitable method to determine metal complex residues present in the LLDPE.

The LLDPE may further comprise additional components such as one or more other polymers and/or one or more additives, Such additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, anti-fungal agents, and combinations thereof. The LLDPE may contain from about 0.1 to about 10 percent by the combined weight of such additives, based on the weight of the LLDPE including such additives.

Any conventional ethylene (co)polymerization solution single reactor reaction processes may be employed to produce the LLDPE. One method of making the LLDPE disclosed herein is described in detail in U.S. Pat. No. 5,977,251, the disclosure of which is incorporated herein by reference in its entirety.

In one embodiment, the LLDPE is prepared via a solution polymerization process in a single reactor, wherein the process comprises polymerizing ethylene and optionally one or more α-olefins in the presence of a catalyst systems comprising a metal complex of a polyvalent aryloxyether corresponding to the formula:

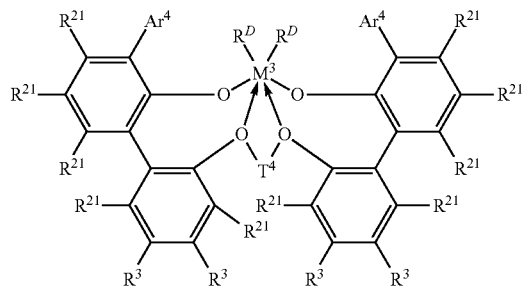

wherein $M^3$ is Ti, Hf or Zr, preferably Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks coplanarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

The ethylene/α-olefin interpolymer composition may be produced via a solution polymerization according to the following exemplary process.

All raw materials (ethylene, 1-hexene) and the process solvent (a narrow boiling range high-purity isoparaffinic solvent commercially available under the tradename ISOPAR E from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to a pressure that is above the reaction pressure, approximate to 750 psig. The solvent and comonomer (1-hexene) feed is pressurized via mechanical positive displacement pump to a pressure that is above the reaction pressure, approximately 750 psig. The individual catalyst components are manually batch diluted to specified component concentrations with purified solvent (ISOPAR E) and pressurized to a pressure that is above the reaction pressure, approximately 750 psig. All reaction feed flows are measured with mass flow meters, independently controlled with computer automated valve control systems.

The combined solvent, monomer, comonomer and hydrogen feed to the reactor is independently temperature controlled to anywhere between 5° C. to 50° C. and typically 40° C. by passing the feed stream through a heat exchanger. The fresh comonomer feed to the polymerization reactor is injected into the reactor. The catalyst components are injected into the polymerization reactor through specially designed injection stingers with no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with static mixing elements. The contents of the reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. As the stream exits the reactor, it is contacted with a deactivating agent, e.g. water, to stop the reaction. In addition, various additives such as anti-oxidants, can be added at this point. The stream then goes through another set of static mixing elements to evenly disperse the catalyst deactivating agent and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatilization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper.

In one embodiment, the LLDPE is prepared via a polymerization process in a single solution phase loop reactor system, wherein the catalyst system comprises (a) one or more procatalysts comprising a metal-ligand complex of formula (I) below:

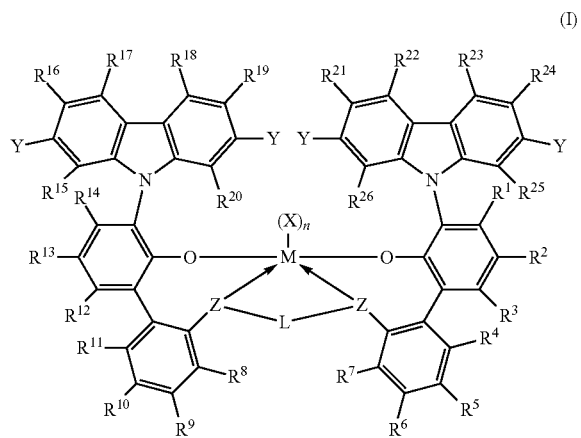

wherein:
M is titanium, zirconium, or hafnium, each independently being in a formal oxidation state of +2, +3, or +4; and n is an integer of from 0 to 3, and wherein when n is 0, X is absent; and
each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and each Z independently is O, S, N(C1-C40)hydrocarbyl, or P(C1-C40)hydrocarbyl; and
L is (C3-C40)hydrocarbylene or (C3-C40)heterohydrocarbylene, wherein the (C3-C40)hydrocarbylene has a portion that comprises a 3-carbon atom to 10-carbon atom linker backbone linking the Z atoms in formula (I) (to which L is bonded) and the (C3-C40)heterohydrocarbylene has a portion that comprises a 3-atom to 10-atom linker backbone linking the Z atoms in formula (I), wherein each of the 3 to 10 atoms of the 3-atom to 10-atom linker backbone of the (C3-C40)heterohydrocarbylene independently is a carbon atom or heteroatom, wherein each heteroatom independently is O, S, S(O), S(O)2, Si($R^C$)2, Ge($R^C$)2, P($R^P$), or N($R^N$), wherein independently each $R^C$ is (C1-C30)hydrocarbyl, each $R^P$ is (C1-C30)hydrocarbyl; and each $R^N$ is (C1-C30) hydrocarbyl or absent; and
$R^{1-26}$ are each independently selected from the group consisting of a (C1-C40)hydrocarbyl, (C1-C40)heterohydrocarbyl, Si($R^C$)3, Ge($R^C$)3, P($R^P$)2, N($R^N$)2, $OR^C$, $SR^C$, NO2, CN, CF3, $R^C$S(O)—, $R^C$S(O)2—, ($R^C$)2C=N—, $R^C$C(O)O—, $R^C$OC(O)—, $R^C$C(O)N(R)—, ($R^C$)2NC(O)—, halogen atom, hydrogen atom, and any combination thereof, each of the hydrocarbyl, heterohydrocarbyl, Si($R^C$)3, Ge($R^C$)3, P($R^P$)2, N($R^N$)2, $OR^C$, $SR^C$, $R^C$S(O)—, $R^C$S(O)2—, ($R^C$)2C=N—, $R^C$C(O)O—, $R^C$OC(O)—, $R^C$C(O)N(R)—, ($R^C$)2NC(O)—, hydrocarbylene, and heterohydrocarbylene groups independently is unsubstituted or substituted with one or more $R^S$ substituents, each $R^S$ independently is a halogen atom, polyfluoro substitution, perfluoro substitution, unsubstituted ($C_1$-$C_{18}$)alkyl, $F_3C$—, $FCH_2O$—, $F_2HCO$—, $F_3CO$—, $R_3Si$—, $R_3Ge$—, RO—, RS—, RS(O)—, RS(O)2—, $R_2P$—, $R_2N$—, $R_2C$=N—, NC—, RC(O)O—, ROC(O)—, RC(O)N(R)—, or $R_2NC$(O)—, or two of the $R^S$ are taken together to form an unsubstituted ($C_1$-$C_{18}$)alkylene, wherein each R independently is an unsubstituted ($C_1$-$C_{18}$)alkyl;
when $R^7$ is H, then $R^8$ is a ($C_1$-$C_{40}$)hydrocarbyl; ($C_1$-$C_{40}$)heterohydrocarbyl; Si($R^C$)3, Ge($R^C$)3, P($R^P$)2, N($R^N$)2, $OR^C$, $SR^C$, NO2, CN, CF3, $R^C$S(O)—, $R^C$S(O)2—, ($R^C$)2C=N—, $R^C$C(O)O—, $R^C$OC(O)—, $R^C$C(O)N(R)—, ($R^C$)2NC(O)— or halogen atom; or when $R^8$ is H, then $R^7$ is a ($C_1$-$C_{40}$) hydrocarbyl; ($C_1$-$C_{40}$)heterohydrocarbyl; Si($R^C$)3, Ge($R^C$)3, P($R^P$)2, N($R^N$)2, $OR^C$, $SR^C$, NO2, CN, CF3, $R^C$S(O)—, $R^C$S(O)2—, ($R^C$)2C=N—, $R^C$C(O)O—, $R^C$OC(O)—, $R^C$C(O)N(R)—, ($R^C$)2NC(O)— or halogen atom;
optionally two or more R groups of the $R^{1-26}$ groups (for example, from $R^{1-7}$, $R^{8-14}$, $R^{8-11}$, $R^{1-3}$, $R^{4-7}$, $R^{15-20}$, $R^{21-26}$) can combine together into ring structures with such ring structures having from 3 to 50 atoms in the ring excluding any hydrogen atoms; and Y has the formula —T($R^d$)$_b$ and contains more than four non-hydrogen atoms, wherein T is, independently for each Y occurrence, selected from the group consisting of C, Si, Ge, N, O, S, P or a combination thereof and wherein T is substituted with $R^d$ substituents, b being an integer from 1 to 3, depending on the valency of T and $R^d$, each $R^d$ is a substituent and is selected from the group consisting of hydrogen, ($C_1$-$C_{40}$)hydrocarbyl; ($C_1$-$C_{40}$)heterohydrocarbyl; Si($R^C$)3, Ge($R^C$)3, P($R^P$)2, N($R^N$)2, $OR^C$, $SR^C$, NO2, CN, CF3, $R^C$S(O)—, $R^C$S(O)2—, ($R^C$)2C=N—, $R^C$C(O)O—, $R^C$OC(O)—, $R^C$C(O)N(R)—, ($R^C$)2NC(O)—, halogen atoms, and any combination thereof.

As used herein, the term "($C_1$-$C_{40}$)hydrocarbyl" means a hydrocarbon radical of from 1 to 40 carbon atoms and the term "($C_1$-$C_{40}$)hydrocarbylene" means a hydrocarbon diradical of from 1 to 40 carbon atoms, wherein each hydrocarbon radical and diradical independently is aromatic (6 carbon atoms or more) or non-aromatic, saturated or unsaturated, straight chain or branched chain, cyclic (including mono- and poly-cyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$. Preferably, a (C1-C40)hydrocarbyl independently is an unsubstituted or substituted (C1-C40)alkyl, (C3-C40)cycloalkyl, (C3-C20)cycloalkyl-(C1-C20)alkylene, (C6-C40)aryl, or (C6-C20)aryl-(C1-C20)alkylene. More preferably, each of the aforementioned (C1-C40) hydrocarbyl groups independently has a maximum of 20 carbon atoms (i.e., (C1-C20)hydrocarbyl), and still more preferably a maximum of 12 carbon atoms.

The terms "(C1-C40)alkyl" and "(C1-C18)alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted (C1-C40)alkyl are unsubstituted (C1-C20)alkyl; unsubstituted (C1-C10)alkyl; unsubstituted (C1-C5)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted (C1-C40)alkyl are substituted (C1-C20)alkyl, substituted (C1-C10)alkyl, trifluoromethyl, and (C45)alkyl. The (C45)alkyl is, for example, a (C27-C40)alkyl substituted by one $R^S$, which is a (C18-C5)alkyl, respectively. Preferably, each (C1-C5)alkyl independently is methyl, trifluoromethyl, ethyl, 1-propyl, 1-methylethyl, or 1,1-dimethylethyl.

The term "(C6-C40)aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein the 1 ring is aromatic and the 2 or 3 rings independently are fused or non-fused and at least one of the 2 or 3 rings is aromatic. Examples of unsubstituted (C6-C40)aryl are unsubstituted (C6-C20)aryl; unsubstituted (C6-C18)aryl; 2-(C1-C5)alkyl-phenyl; 2,4-bis(C1-C5)alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted (C6-C40)aryl are substituted (C6-C20)aryl; substituted (C6-C18)aryl; 2,4-bis [(C20) alkyl] -phenyl; polyfluorophenyl; pentafluorophenyl; and fluoren-9-one-1-yl.

The term "(C3-C40)cycloalkyl" means a saturated cyclic hydrocarbon radical of from 3 to 40 carbon atoms that is unsubstituted or substituted by one or more $R^S$. Other cycloalkyl groups (e.g., (C3-C12)alkyl)) are defined in an analogous manner. Examples of unsubstituted (C3-C40) cycloalkyl are unsubstituted (C3-C20)cycloalkyl, unsubstituted (C3-C10)cycloalkyl, cyclopropyl, cyclobutyl, cyclopentyl, cyclohexyl, cycloheptyl, cyclooctyl, cyclononyl, and cyclodecyl. Examples of substituted (C3-C40)cycloalkyl are substituted (C3-C20)cycloalkyl, substituted (C3-C10)cycloalkyl, cyclopentanon-2-yl, and 1-fluorocyclohexyl.

Examples of (C1-C40)hydrocarbylene are unsubstituted or substituted (C6-C40)arylene, (C3-C40)cycloalkylene, and (C1-C40)alkylene (e.g., (C1-C20)alkylene). In some embodiments, the diradicals are a same carbon atom (e.g., -CH2-) or on adjacent carbon atoms (i.e., 1,2-diradicals), or are spaced apart by one, two, or more intervening carbon atoms (e.g., respective 1,3-diradicals, 1,4-diradicals, etc.). Preferred is a 1,2-, 1,3-, 1,4-, or an alpha, omega-diradical, and more preferably a 1,2-diradical. The alpha, omega-diradical is a diradical that has maximum carbon backbone spacing between the radical carbons. More preferred is a 1,2-diradical, 1,3-diradical, or 1,4-diradical version of (C6-C18)arylene, (C3-C20)cycloalkylene, or (C2-C20)alkylene. The term "(C1-C40)alkylene" means a saturated straight chain or branched chain diradical (i.e., the radicals are not on ring atoms) of from 1 to 40 carbon atoms that is unsubstituted or substituted by one or more $R^s$. Examples of unsubstituted (C1-C40)alkylene are unsubstituted (C1-C20)alkylene, including unsubstituted 1,2-(C2-C10)alkylene; 1,3-(C3-C10)alkylene; 1,4-(C4-C10)alkylene; —CH2—, —CH2CH2—, —(CH2)3—,

—(CH2)4—, —(CH2)5—, —(CH2)6—, —(CH2)7—, —(CH2)8—, and —(CH2)4C(H)(CH3)—. Examples of substituted (C1-C40)alkylene are substituted (C1-C20)alkylene, —CF2—, —C(O)—, and —(CH2)14C(CH3)2(CH2) 5— (i.e., a 6,6-dimethyl substituted normal-1,20-eicosylene). Since as mentioned previously two $R^S$ may be taken together to form a (C1-C18)alkylene, examples of substituted (C1-C40)alkylene also include 1,2-bis(methylene)cyclopentane, 1,2-bis(methylene)cyclohexane, 2,3 -bis(methylene)-7,7-dimethyl-bicyclo[2.2.1]heptane, and 2,3-bis (methylene)bicyclo[2.2.2]octane.

The term "(C3-C40)cycloalkylene" means a cyclic diradical (i.e., the radicals are on ring atoms) of from 3 to 40 carbon atoms that is unsubstituted or substituted by one or more $R^S$. Examples of unsubstituted (C3-C40)cycloalkylene are 1,3-cyclopropylene, 1,1-cyclopropylene, and 1,2-cyclohexylene. Examples of substituted (C3-C40)cycloalkylene are 2-oxo-1,3-cyclopropylene and 1,2-dimethyl-1,2-cyclohexylene.

The term "(C1-C40)heterohydrocarbyl" means a heterohydrocarbon radical of from 1 to 40 carbon atoms and the term "(C1-C40)heterohydrocarbylene means a heterohydrocarbon diradical of from 1 to 40 carbon atoms, and each heterohydrocarbon independently has one or more heteroatoms O; S; S(O); S(O)2; Si($R^C$)2; Ge($R^C$)2; P($R^P$); and N($R^N$), wherein independently each $R^C$ is unsubstituted (C1-C18)hydrocarbyl, each $R^P$ is unsubstituted (C1-C18) hydrocarbyl; and each $R^N$ is unsubstituted (C1-C18)hydrocarbyl or absent (e.g., absent when N comprises —N═ or tri-carbon substituted N). The heterohydrocarbon radical and each of the heterohydrocarbon diradicals independently is on a carbon atom or heteroatom thereof, although preferably is on a carbon atom when bonded to a heteroatom in formula (I) or to a heteroatom of another heterohydrocarbyl or heterohydrocarbylene. Each (C1-C40)heterohydrocarbyl and (C1-C40)heterohydrocarbylene independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

Co-Catalyst Component

The procatalyst comprising the metal-ligand complex of formula (I) may be rendered catalytically active, in some embodiments, by contacting it to, or combining it with, the activating co-catalyst or by using an activating technique such as those that are known in the art for use with metal-based olefin polymerization reactions. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or mono-alkylaluminum dihalide, a dialkyl aluminum hydride or dialkyl aluminum halide, or a trialkylaluminum. Aluminoxanes and their preparations are known at, for example, U.S. Pat. No. 6,103,657. Examples of preferred polymeric or oligomeric alumoxanes are methylalumoxane, triisobutyl-aluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri((C1-C10) alkyl)aluminum or tri((C6-C18)aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating co-catalyst is a tris((C1-C20) hydrocarbyl) borate (e.g., trityl tetrafluoroborate) or a tri ((C1-C20)hydrocarbyl)ammonium tetra((C1-C20)hydrocarbyl)borane (e.g., bis(octadecyl)methylammonium tetrakis (pentafluorophenyl)borane). As used herein, the term "ammonium" means a nitrogen cation that is a ((C1-C20) hydrocarbyl)4N+, a ((C1-C20)hydrocarbyl)3N(H)+, a ((C1-C20)hydrocarbyl)2N(H)2+, (C1-C20)hydrocarbylN(H)3+, or N(H)4+, wherein each (C1-C20)hydrocarbyl may be the same or different.

Exemplary combinations of neutral Lewis acid activating co-catalysts include mixtures comprising a combination of a tri((C1-C4)alkyl)aluminum and a halogenated tri((C6-C18) aryl)boron compound, especially a tris(pentafluorophenyl) borane. Other exemplaey embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluoro-phenylborane):(alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating co-catalysts and activating techniques have been previously taught with respect to different metal-ligand complexes in the following U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiemtns, the procatalyst comprising the metal-ligand complex of formula (I) may be activated to form an active catalyst composition by combination with one or more cocatalyst such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis(pentafluorophenyl)borate(1-) amine, triethyl aluminum (TEA), and any combinations thereof.

In some embodiments, one or more of the foregoing activating co-catalysts are used in combination with each other. An especially preferred combination is a mixture of a tri((C1-C4)hydrocarbyl)aluminum, tri((C1-C4)hydrocarbyl) borane, or an ammonium borate with an oligomeric or polymeric alumoxane compound.

The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris (pentafluorophenyl)borane alone is used as the activating co-catalyst, in some other embodiments, the number of moles of the tris(pentafluorophenyl)borane that are employed to the total number of moles of one or more metal-ligand complexes of formula (I) form 0.5:1 to 10:1, in some other embodiments, from 1:1 to 6:1, in some other embodiments, from 1:1 to 5:1. The remaining activating co-catalysts are generally employed in approximately mole quantities equal to the total mole quantities of one or more metal-ligand complexes of formula (I).

End-Use Applications

The LLDPEs according to the present disclosure are suitable for blown film extrusion process. The LLDPEs according to the present disclosure may be extruded in neat form or in blends with other polymers, additives and fillers. The films may be monolayer or coextruded multi-layer films obtained by various extrusion through a single or multiple dies. The resultant films may be the used as-is or may be laminated to other films or substrates, for example by thermal, adhesive lamination or direct extrusion onto a substrate. The resultant films and laminates may be subjected to other forming operations such as embossing, stretching, thermoforming. Surface treatments such as corona may be applied and the films may be printed.

The films according to the present invention have a thickness in the range of from 20 to 120 microns. All individual values and subranges from 20 to 120 microns (μm) are disclosed and included herein. For example, the thickness of the film may range from a lower limit of 20, 40, 60, 80 or 100 microns to an upper limit of 30, 50, 70, 90, 110 or 120 microns. For example, the thickness of the film may range from 20 to 120 microns, or in the alternative, from 20 to 60 microns, or in the alternative, from 40 to 100 microns, or in the alternative from 20 to 70 microns.

In a particular embodiment, the film is made from the inventive linear low density polyethylene composition and no other polymeric components.

In another embodiment, the film is made from a blend of the inventive linear low density polyethylene composition blended with a low density polyethylene (LDPE).

In a particular embodiment, a monolayer film having a thickness of 50 microns is produced solely from the inventive linear low density polyethylene composition and exhibits a haze of equal to or less than 30%.

In a particular embodiment, a monolayer film having a thickness of 50 microns is produced solely from the inventive linear low density polyethylene composition and exhibits a dart impact of equal to or greater than 1,000 grams (g). At the same time, the processability of the inventive polyethylene results in at least 8% lower melt pressure, and at least lower 8% amperage consumption, compared to a common metallocene-LLDPE made in the gas phase process, at similar values of melt index and density and equivalent processing hardware and conditions.

In yet another embodiment, a monolayer film having a thickness of 50 microns is produced from 85 wt % of the inventive linear low density polyethylene composition and 15 wt % of an LDPE (having a density of 0.923 g/cm³ and an $I_2$ of 0.75 g/10 min) and the film exhibits a haze of equal to or less than 5%.

In a particular embodiment, a monolayer film having a thickness of 50 microns is produced from 85 wt % of the inventive linear low density polyethylene composition and 15 wt % of an LDPE (having a density of 0.923 g/cm³ and an $I_2$ of 0.75 g/10 min) and the film exhibits a dart impact of equal to or greater than 450 grams (g).

The films made from inventive compositions may be used in a variety of purposes, for example films for lamination, for frozen food packaging, for silage wrap films, for stretch hood films, and many other agricultural, food packaging and industrial packaging applications.

EXAMPLES

The following examples illustrate the present invention but are not intended to limit the scope of the invention. The examples of the instant invention demonstrate that selection of LLDPE of the present disclosure leads to [improved properties] while maintaining the polymerization process at a low cost.

Comparative composition 1 is EXCEED 1018 is an ethylene-hexene copolymer prepared via gas phase polymerization process in the presence of a metallocene catalyst system having a melt index ($I_2$) of approximately 1.0 g/10 minutes, a density of approximately 0.918 g/cm³, a CEF fraction from 70 to 90° C. of 61.9%, an $I_{10}/I_2$ of about 6.0, which is commercially available from ExxonMobil Chemical Company (Houston, Tex., USA).

Comparative composition 2 is DOWLEX 4056G which is an ethylene-hexene copolymer having a melt index ($I_2$) of 1.3 g/10 min, a density of 0.916 g/cm³, a CEF fraction from 70 to 90° C. of 50.3%, an $I_{10}/I_2$ of 7.4, which is commercially available from The Dow Chemical Company (Midland, Mich., USA).

Inventive composition 1 is an ethylene-hexene copolymer prepared via solution polymerization process in a single reactor in the presence of a catalyst system comprising a metal complex of a polyvalent aryloxyether having a melt index ($I_2$) of 1.05 g/10 minutes, a density of 0.916 g/cm³, a CEF fraction from 70 to 90° C. of 90.3%, an $I_{10}/I_2$ of 7.3. Inventive composition 1 is prepared via solution polymerization in a single loop reactor system as described in U.S. Pat. No. 5,977,251 in the presence of a Zirconium based catalyst system ("Post-Metallocene Catalyst") comprising [2,2'''-[1,3-propanediylbis(oxy-κO)]bis[3'',5,5''-tris(1,1-dimethylethyl)-5'-methyl[1,1':3',1''-terphenyl]-2'-olato-κO]] dimethyl-, (OC-6-33)-Zirconium, represented by the following formula:

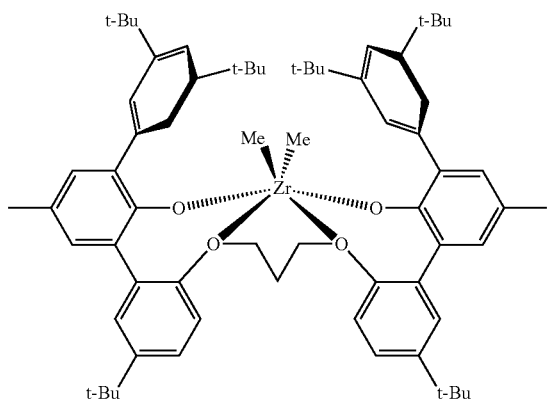

The polymerization conditions for Inventive composition 1 are reported in Tables 1 and 2. Referring to Tables 1 and 2, TEA is triethylaluminum and PETROSOL D 100/120 is solvent which is commercially available from CEPSA (Compañía Española de Petróleos, S.A.U., Madrid, Spain). Molecular weight properties of the Inventive and Comparative compositions are measured and reported in Table 3.

TABLE 1

| 1. REACTOR FEEDS | Units | Inventive Composition 1 |
|---|---|---|
| Reactor Solvent/Ethylene Feed Flow ratio | g/g | 4.04 |
| Solvent Type Used | | PETROSOL D 100/120 |
| Comonomer Type Used | | 1-Hexene |
| Reactor Comonomer/Ethylene Feed Flow ratio | g/g | 0.263 |
| Reactor Fresh Hydrogen/ethylene Feed Flow ratio | g/kg | 0.058 |
| Reactor Control Temperature | ° C. | 160 |
| Reactor Pressure (gauge) | Bar | 52 |
| Reactor Ethylene Conversion | % | 86.9 |
| Reactor Residence Time | min | 6.5 |
| Recycle Ratio | | 4.2 |

TABLE 2

| 2. CATALYST | Inventive Composition 1 |
|---|---|
| Reactor Co-Catalyst-1/Catalyst Molar feed Ratio | 2.0 |
| Reactor Co-Catalyst-1 Type | bis(hydrogenated tallow alkyl)methyl, tetrakis(pentafluorophenyl)borate(1-) amine |
| Reactor Co-Catalyst-2/Catalyst Molar Ratio | 42 |
| Reactor Co-Catalyst-2 Type | TEA |

TABLE 3

| | $M_n$ (g/mol) | $M_w$ (g/mol) | $M_z$ (g/mol) | $M_w/M_n$ | $M_z/M_w$ |
|---|---|---|---|---|---|
| Inventive Composition 1 | 43400 | 94000 | 178000 | 2.17 | 1.89 |
| Comparative Composition 1 | 39600 | 104100 | 185000 | 2.63 | 1.78 |
| Comparative Composition 2 | 28800 | 111500 | 320000 | 3.88 | 2.87 |

Inventive composition 1 and Comparative compositions 1 and 2 are extruded on a COVEX 45 mm blown film line to produce monolayer films to form Inventive Film 1, Comparative Film 1 and Comparative Film 2. The monolayer films are produced in accordance with the process conditions, shown in Tables 4 and 5. Additional monolayer films were made under the same conditions for extruder hopper blends of 85 wt % each of Inventive composition 1 and Comparative compositions 1 and 2 and 15 wt % LDPE 310E (which is commercially available from The Dow Chemical Company), as shown in Table 6.

TABLE 4

Die gap (mm): 0.8
Line Speed (m/min): 7.5
Melt Temperature (° C.): 215
Output Rate (Kg/h): 5
Thickness (μm): 50

TABLE 5

Extruder conditions

| | |
|---|---|
| Blow up ratio | 2.5:1 |
| Corona treated (dyne) | 0 |
| Die gap (mm) | 1.5 |
| Output Rate (Kg/h) | 22.5 |
| Screw Speed (rpm) | 60 |
| Take-off Speed (m/min) | 7 |
| Frost line | 33-34 cm |
| Lay flat | 584 mm |
| Thickness (μm) | 50 |

TABLE 6

| Film Example | Produced from an extruder hopper blend of: |
|---|---|
| Inventive Film 2 | 85 wt % Inventive Composition 1 and 15 wt % LDPE 310E |
| Comparative Film 3 | 85 wt % Comparative composition 1 and 15 wt % LDPE 310E |
| Comparative Film 4 | 85 wt % Comparative composition 2 and 15 wt % LDPE 310E |

Tables 7 and 8 provide a number of properties for each of Inventive Films 1 and 2 and Comparative Films 1-4.

TABLE 7

| | Units | Inventive Film 1 | Comparative Film 2 | Comparative Film 1 |
|---|---|---|---|---|
| Melt Pressure | Bar | 208 | 187 | 243 |
| Motor Current | Amp | 37.7 | 33.3 | 41.0 |
| Dart Impact | G | 1099 | 465 | 1110 |
| CD Elmendorf | G | 758 | 1050 | 712 |
| MD Elmendorf | G | 567 | 920 | 604 |
| Gloss | Gloss | 33.3 | 51.6 | 22.1 |
| Haze | % | 20.7 | 13.0 | 36.5 |
| Clarity | % | 93.8 | 98.3 | 82.2 |
| Puncture Elongation | Mm | 100 | 102 | 91 |
| Puncture Energy | J | 3.1 | 3.1 | 3.0 |
| Puncture Force | N | 50.1 | 48.1 | 51.9 |
| Puncture Resistance | J/cm$^3$ | 7.7 | 7.3 | 6.9 |
| CD Strain at Break | % | 620 | 551 | 578 |
| Strain at Tensile Strength | % | 620 | 551 | 578 |
| Strain at Yield | % | 14.2 | 13.6 | 14.3 |
| Stress at Break | MPa | 37.3 | 20.1 | 34.5 |
| Stress at Yield | MPa | 6.2 | 7.7 | 8.0 |
| Tensile Strength | MPa | 37.3 | 20.1 | 34.5 |
| Thickness | μm | 50 | 51 | 50 |
| CD Toughness | MJ/m$^3$ | 86 | 55 | 78 |
| MD Strain at Break | % | 528 | 549 | 494 |
| Strain at Tensile Strength | % | 528 | 548 | 494 |
| Strain at Yield | % | 7.7 | 5.5 | 5.2 |
| Stress at Break | MPa | 29.3 | 24.0 | 28.1 |
| Stress at Yield | MPa | 5.4 | 6.3 | 6.8 |
| Tensile Strength | MPa | 29.3 | 24.1 | 28.1 |
| Thickness | μm | 52 | 49 | 51 |
| MD Toughness | MJ/m$^3$ | 67 | 63 | 63 |

TABLE 8

| | Units | Inventive Film 2 | Comparative Film 4 | Comparative Film 3 |
|---|---|---|---|---|
| Melt Pressure | Bar | 207 | 184 | 244 |
| Motor Current | Amp | 35.2 | 31.2 | 39 |
| Dart Impact | G | 509 | 297 | 417 |
| CD Elmendorf | G | 817 | 1080 | 938 |
| MD Elmendorf | G | 424 | 626 | 491 |
| Gloss | Gloss | 75.2 | 71.7 | 75.4 |
| Haze | % | 4.4 | 4.6 | 4.6 |
| Clarity | % | 98.7 | 99.0 | 99.2 |
| Puncture Elongation | Mm | 97 | 106 | 95 |
| Puncture Energy | J | 3.2 | 3.5 | 3.3 |
| Puncture Force | N | 52.0 | 53.6 | 55.8 |
| Puncture Resistance | J/cm$^3$ | 7.8 | 8.5 | 7.8 |
| CD Strain at Break | % | 631 | 697 | 614 |
| Strain at Tensile Strength | % | 631 | 697 | 614 |
| Strain at Yield | % | 13.8 | 13.6 | 13.3 |
| Stress at Break | MPa | 34.2 | 31.6 | 35.2 |
| Stress at Yield | MPa | 6.8 | 7.9 | 8.2 |
| Tensile Strength | MPa | 34.2 | 31.6 | 35.2 |
| Thickness | μm | 50 | 50 | 50 |
| CD Toughness | MJ/m$^3$ | 85 | 92 | 85 |
| MD Strain at Break | % | 521 | 613 | 540 |
| Strain at Tensile Strength | % | 521 | 613 | 540 |
| Strain at Yield | % | 5.0 | 5.7 | 5.0 |
| Stress at Break | MPa | 29.7 | 29.4 | 30.7 |
| Stress at Yield | MPa | 5.6 | 6.7 | 6.8 |
| Tensile Strength | MPa | 29.7 | 29.4 | 30.7 |
| Thickness | μm | 49 | 50 | 49 |
| MD Toughness | MJ/m$^3$ | 76 | 84 | 79 |

Test Methods

Test methods include the following:

Melt index

Melt indices ($I_2$ and $I_{10}$) were measured in accordance to ASTM D-1238 at 190° C. and at 2.16 kg and 10 kg load, respectively. Their values are reported in g/10 min.

Density

Samples for density measurement were prepared according to ASTM D4703. Measurements were made within one hour of sample pressing using ASTM D792, Method B.

High Temperature Gel Permeation Chromatography

The Gel Permeation Chromatography (GPC) system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer ChAR (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using the following Equation (as described in Williams and Ward, *J. Polym. Sci.*, Polym. Letters, 6, 621 (1968)):

$$M_{polyethylene}=A\times(M_{polystyrene})^B,$$

where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as the molecular weight distribution (MWD or $M_w/M_n$), and related statistics (generally refers to conventional GPC or cc-GPC results), is defined here as the modified method of Williams and Ward.

Crystallization Elution Fractionation (CEF) Method

The Crystallization Elution Fractionation (CEF) method is conducted according to the method described in Monrabal et al, Macromol. Symp. 257, 71-79 (2007), which is incorporated herein by reference. The CEF instrument is equipped with an IR-4 detector (such as that sold commercially from PolymerChar, Spain) and a two angle light scattering detector Model 2040 (such as those sold commercially from Precision Detectors). The IR-4 detector operates in the compositional mode with two filters: C006 and B057. A 10 micron guard column of 50 mm×4.6 mm (such as that sold commercially from PolymerLabs) is installed before the IR-4 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2~0.5 mm) (such as commercially available from EMD Chemicals) is also obtained. The silica gel is dried in a vacuum oven at 160° C. for about two hours before use. Eight hundred milligrams of BHT and five grams of silica gel are added to two liters of ODCB. ODCB containing BHT and silica gel is hereinafter referred to as "ODCB-m." ODCB-m is sparged with dried nitrogen ($N_2$) for one hour before use. Dried nitrogen is obtained by passing nitrogen at <90 psig over $CaCO_3$ and 5 Å molecular sieves. A sample solution is prepared by, using the autosampler, dissolving a polymer sample in ODCB-m at 4 mg/ml under shaking at 160° C. for 2 hours. 300 µL of the sample solution is injected into the column. The temperature profile of CEF is: crystallization at 3° C./min from 110° C. to 25° C., thermal equilibrium at 30° C. for 5 minutes (including Soluble Fraction Elution Time being set as 2 minutes), and elution at 3° C./min from 25° C. to 140° C. The flow rate during crystallization is 0.052 mL/min. The flow rate during elution is 0.50 mL/min. The IR-4 signal data is collected at one data point/second.

The CEF column is packed with glass beads at 125 µm±6% (such as those commercially available from MO-SCI Specialty Products) with ⅛ inch stainless tubing according to U.S. 2011/0015346 A1. The internal liquid volume of the CEF column is between 2.1 mL and 2.3 mL. Temperature calibration is performed by using a mixture of NIST Standard Reference Material linear polyethylene 1475a (1.0 mg/ml) and Eicosane (2 mg/ml) in ODCB-m. The calibration consists of four steps: (1) calculating the delay volume defined as the temperature offset between the measured peak elution temperature of Eicosane minus 30.00° C.; (2) subtracting the temperature offset of the elution temperature from the CEF raw temperature data. It is noted that this temperature offset is a function of experimental conditions, such as elution temperature, elution flow rate, etc.; (3) creating a linear calibration line transforming the elution temperature across a range of 25.00° C. and 140.00° C. such that NIST linear polyethylene 1475a has a peak temperature at 101.00° C., and Eicosane has a peak temperature of 30.00° C., (4) for the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

The CEF fraction from 70 to 90° C., is defined as the integral of the IR-4 chromatogram (baseline subtracted measurement channel) in the elution temperature ranging from 70.0 to 90.0° C. divided by the total integral from 25 to 140.0° C. according to the follow equation:

$$\text{CEF fraction from 70 to 90° C.} = \frac{\int_{70}^{90} IRdT}{\int_{25}^{140} IRdT} \times 100\%$$

where T is the elution temperature (from the calibration discussed above).

A linear baseline is calculated by selecting two data points: one before the polymer elutes, usually at a temperature of 25.5° C., and another one after the polymer elutes, usually at 118° C. For each data point, the detector signal is subtracted from the baseline before integration.

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{0B}}{\eta_{0L}} = \frac{\eta_{0B}}{2.29^{-15} M_{w-gpc}^{3.65}}$$

The ZSV value is obtained from creep test at 190° C. via. the method described above. The Mw-gpc value is determined by the conventional GPC method. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M, Jr.; Huang, Joe W. L.; Reichek, Kenneth N. Detection of low levels of long-chain branching in polyolefins. Annual Technical Conference-Society of Plastics Engineers (2008), 66th 887-891.

$^1$H NMR Method 3.26 g of stock solution is added to 0.133 g of polyolefin sample in 10 mm NMR tube. The stock solution is a mixture of tetrachloroethane-d$_2$ (TCE) and perchloroethylene (50: 50, w:w) with 0.001 M Cr$^{3+}$. The solution in the tube is purged with N$_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The $^1$H NMR are run with a 10 mm cryoprobe at 120° C. on Bruker AVANCE 400 MHz spectrometer.

Two experiments are run to get the unsaturation: the control and the double pre-saturation experiments.

For the control experiment, the data is processed with exponential window function with LB=1 Hz, baseline was corrected from 7 to −2 ppm. The signal from residual $^1$of TCE is set to 100, the integral I$_{total}$ from −0.5 to 3 ppm is used as the signal from whole polymer in the control experiment. The number of CH$_2$ group, NCH$_2$, in the polymer is calculated as following:

$$NCH_2 = I_{total}/2$$

Figure 2:
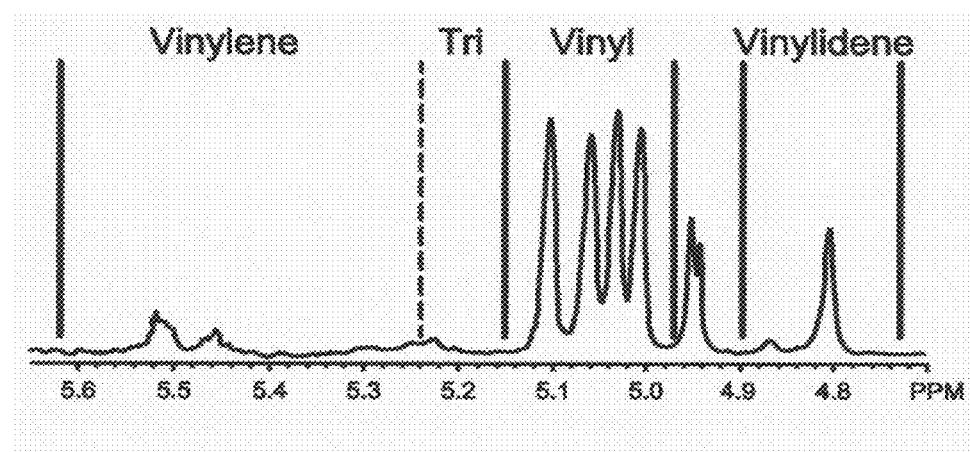
FIG. 2 is a graph illustrating corresponding integrals for unsaturations ($I_{vinylene}$, $I_{trisubstituted}$, $I_{vinyl}$ and $I_{vinylidene}$)

For the double presaturation experiment, the data is processed with exponential window function with LB=1 HZ, baseline was corrected from 6.6 to 4.5 ppm. The signal from residual $_1$H of TCE is set to 100, the corresponding integrals for unsaturations (I$_{vinylene}$, I$_{trisubstituted}$, I$_{vinyl}$ and I$_{vinylidene}$) were integrated based on the region in the graph shown on FIG. 2.

The number of unsaturation unit for vinylene, trisubstituted, vinyl and vinylidene are calculated:

$$N_{vinylene} = I_{vinylene}/2$$

$$N_{trisubstituted} = I_{trisubstitute}$$

$$N_{vinyl} = I_{vinyl}/2$$

$$N_{vinylidene} = I_{vinylidene}/2$$

The unsaturation unit/ 1,000,000 carbons is calculated as following:

$$N_{vinylene}/1,000,000C = (N_{vinylene}/NCH_2)*1,000,000$$

$$N_{trisubstituted}/1,000,000C = (N_{trisubstituted}/NCH_2)*1,000,000$$

$$N_{vinyl}/1,000,000C = (N_{vinyl}/NCH_2)*1,000,000$$

$$N_{vinylidene}/1,000,000C = (N_{vinylidene}/NCH_2)*1,000,000$$

The requirement for unsaturation NMR analysis includes: level of quantitation is 0.47 ±0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation is defined as signal to noise ratio of 10.

The chemical shift reference is set at 6.0 ppm for the $^1$H signal from residual proton from TCT-d2. The control is run with ZG pulse, TD 32768, NS 4, DS 12, SWH 10,000 Hz, AQ 1.64s, D1 14s. The double presaturation experiment is run with a modified pulse sequence, O1P 1.354 ppm, O2P 0.960 ppm, PL9 57db, PL21 70 db, TD 32768, NS 200, DS 4, SWH 10,000 Hz, AQ 1.64s, D1 1s, D13 13s. The modified pulse sequences for unsaturation with. Bruker AVANCE 400 MHz spectrometer are shown in FIG. 3.

Film Testing Conditions

The following physical properties are measured on the films produced:

Dart Drop Impact: ISO 7765-1/1998
Tensile strength: ASTM 527-3
Shrinkage ASTM D2732
Puncture: ASTM D-5748-95
Elmendorf Tear: ASTM D1922-09
Gloss (@ 45 degrees: ASTM D2457-08
Haze: ASTM D1003-11
Hot Tack CT): ASTM F1921-98
Seal Strength CD: ASTM F2029-00

The present invention may be embodied in other forms without departing from the spirit and the essential attributes thereof, and, accordingly, reference should be made to the appended claims, rather than to the foregoing specification, as indicating the scope of the invention.

We claim:

1. A linear low density polyethylene which exhibits each of the following properties:
    (1) a crystallization elution fractionation (CEF) fraction from 70° C. to 90° C. of equal to or greater than 80% of total CEF fractions;
    (2) a melt index, $I_2$, measured according to ASTM D 1238 (2.16 kg @190° C.), from 0.8 g/10 minutes to 1.5 g/10 minutes; and
    (3) a melt flow ratio, $I_{10}/I_2$ from 7.0 to 8.0.

2. The linear low density polyethylene according to claim 1, further exhibiting a density (measured according to ASTM D792) from 0.914 to 0.920 g/cm³.

3. The linear low density polyethylene according to claim 1, wherein the linear low density polyethylene comprises units derived from ethylene and units derived from one or more comonomers selected from the group consisting of butene, hexene, and octene.

4. The linear low density polyethylene according to claim 1, wherein the linear low density polyethylene comprises units derived from ethylene and units derived from hexene.

5. The linear low density polyethylene according to claim 1, wherein the linear low density polyethylene is produced in a single loop solution polymerization reactor.

6. An article of manufacture comprising at least one component produced from the linear low density polyethylene according to claim 1.

7. The article of manufacture according to claim 6 wherein the article is a stand up pouch.

8. A film layer consisting of the linear low density polyethylene according to claim 1, wherein the film layer exhibits a dart impact of equal to or greater than 1,000 g.

9. A film layer having a thickness of 50 microns, the film layer comprising a blend of 85 wt % of the linear low density polyethylene according to claims 1 and 15 wt % of a low density polyethylene having a density of 0.923 g/cm³ and an $I_2$ of 0.75 g/10 min, wherein the film layer exhibits one or more of the following properties:
    (i) a haze of less than 5%; and
    (ii) a dart impact of greater than 450 g.

* * * * *